United States Patent
Xue et al.

(10) Patent No.: US 11,715,261 B2
(45) Date of Patent: Aug. 1, 2023

(54) METHOD FOR DETECTING AND MODELING OF OBJECT ON SURFACE OF ROAD

(71) Applicants: Continental Automotive GmbH, Hannover (DE); Continental Holding China Co , Ltd, Yangpu Shanghai (CN)

(72) Inventors: Haitao Xue, Chengdu (CN); Dongbing Quan, Mianyang (CN); Changhong Yang, Chengdu (CN); James Herbst, Chicago, IL (US)

(73) Assignee: Continental Automotive GmbH, Hannover (DE)

( * ) Notice: Subject to any disclaimer, the term of this patent is extended or adjusted under 35 U.S.C. 154(b) by 153 days.

(21) Appl. No.: 17/344,405

(22) Filed: Jun. 10, 2021

(65) Prior Publication Data

US 2021/0304492 A1  Sep. 30, 2021

Related U.S. Application Data

(63) Continuation of application No. PCT/CN2018/120886, filed on Dec. 13, 2018.

(51) Int. Cl.
*G06T 17/05* (2011.01)
*G06V 20/56* (2022.01)
(Continued)

(52) U.S. Cl.
CPC ............ *G06T 17/05* (2013.01); *G06T 3/4038* (2013.01); *G06T 17/30* (2013.01); *G06V 20/588* (2022.01);
(Continued)

(58) Field of Classification Search
CPC ...... G06V 20/56; G06V 20/58; G06V 20/586; G06V 20/588; G06T 2207/30256; G06T 2207/30252; G06T 17/00; G06T 17/05
See application file for complete search history.

(56) References Cited

U.S. PATENT DOCUMENTS

| 2013/0010074 A1 | 1/2013 | Takiguchi |
| 2017/0203692 A1 | 7/2017 | Friebe |

(Continued)

FOREIGN PATENT DOCUMENTS

| CN | 104766366 A | 7/2015 |
| WO | 2018015811 A1 | 1/2018 |

OTHER PUBLICATIONS

International Searching Authority. International Search Report and Written Opinion for application PCT/CN2018/120886. dated Sep. 11, 2019. 9 pages.

(Continued)

*Primary Examiner* — Ryan McCulley
(74) *Attorney, Agent, or Firm* — Continental Automotive GmbH

(57) ABSTRACT

A method for detecting and modelling of an object on a surface of a road by first scanning the road and generating a 3D model of the scanned road (which 3D model of the scanned road contains a description of a 3D surface of the road) and then creating a top-view image of the road. The object is detected on the surface of the road by evaluating the top-view image of the road. The detected object is projected on the surface of the road in the 3D model of the scanned road. The object projected on the surface of the road in the 3D model of the scanned road is modelled.

2 Claims, 3 Drawing Sheets

(51) Int. Cl.
 *G06T 3/40* (2006.01)
 *G06T 17/30* (2006.01)
 *H04N 5/262* (2006.01)
 *H04N 23/90* (2023.01)
 *G08G 1/0967* (2006.01)

(52) U.S. Cl.
 CPC ........... *H04N 5/2628* (2013.01); *H04N 23/90* (2023.01); *G06T 2210/56* (2013.01); *G08G 1/096708* (2013.01); *G08G 1/096766* (2013.01)

(56) References Cited

U.S. PATENT DOCUMENTS

| | | | |
|---|---|---|---|
| 2018/0067494 A1 | 3/2018 | Schiffmann | |
| 2018/0188026 A1 | 7/2018 | Zhang et al. | |
| 2018/0224863 A1 | 8/2018 | Fu | |
| 2019/0156128 A1* | 5/2019 | Zhang | G08G 1/167 |
| 2020/0109954 A1* | 4/2020 | Li | G05D 1/0291 |

OTHER PUBLICATIONS

Supplementary European Search Report—EP18943309—Search Authority—Berlin—dated Jul. 26, 2022.

* cited by examiner

METHOD FOR DETECTING AND MODELING OF OBJECT ON SURFACE OF ROAD

CROSS-REFERENCE TO RELATED APPLICATIONS

This application is a continuation of pending International Application No. PCT/CN2018/120886 filed on 13 Dec. 2018, which designates the United States. The disclosure of PCT/CN2018/120886 is incorporated by reference herein.

BACKGROUND

1. Field of the Invention

The invention relates to relates to a method for detecting and modelling of an object on a surface of a road. Moreover, the disclosure relates to a system for detecting and modelling of an object on a surface of a road.

2. Description of Relevant Art

Advanced driver assistance systems and autonomously driving cars require high precision maps of roads and other areas on which vehicles can drive. Determining a vehicle's position on a road or even within a lane of a road with an accuracy of a few centimeters cannot be achieved using conventional satellite navigation systems, for example GPS, Galileo, GLONASS, or other known positioning techniques such as triangulation and the like. However, in particular, when a self-driving vehicle moves on a road with multiple lanes, it needs to exactly determine its lateral and longitudinal position within the lane.

One known way to determine a vehicle's position with high precision involves one or more cameras capturing images of road markings/road paints and comparing unique features of road markings/road paints or objects along the road in the captured images with corresponding reference images obtained from a database, in which reference images the respective position of road markings/paints or objects is provided. This way of determining a position provides sufficiently accurate results only when the database provides highly accurate position data with the images and when it is updated regularly or at suitable intervals.

Road markings may be captured and registered by special purpose vehicles that capture images of a road while driving, or may be extracted from aerial photographs or satellite images. The latter variant may be considered advantageous since a perpendicular view or top-view image shows little distortion of road markings/paints and other features on substantially flat surfaces.

However, aerial photographs and satellite images may not provide sufficient detail for generating highly accurate maps of road markings/paints and other road features. Also, aerial photographs and satellite images are less suitable for providing details on objects and road features that are best viewed from a ground perspective.

SUMMARY

The embodiments are providing a method for detecting and modelling of an object on a surface of a road, which allows to determine an accurate three-dimensional (3D) position of the object on the surface of the road. Embodiments may further provide a system for detecting and modelling of an object on a surface of a road configured to provide an accurate three-dimensional position of the object on the surface of the road.

One embodiments relates to a method for detecting and modelling of an object on a surface of the road, in a first step, the road is scanned. In a subsequent second step, a 3D model of the scanned road is generated. The 3D model contains a description (data representation) of a 3D surface of the road. In a subsequent third step a top-view image of the road is created.

In a fourth step of the method, the object is detected on the surface of the road by evaluating the top-view image of the road. In a fifth step of the method, the detected object is projected on the surface of the road in the 3D model of the scanned road. In a final sixth step of the method, the object projected on the surface of the road in the 3D model of the scanned road is modelled.

Conventional methods of object/road paint detection being located on a surface of a road and modelling the detected object/road paint often provide an inaccurate three-dimensional position of the road paint or the object as well as an incorrect logical information of the road paint or the object on the surface of the road. In particular, since a patch of painting is detected once from every frame captured by a camera system, it is very difficult to get the connectivity between detected results from different frames. In addition, the detected object on the surface of the road or the detected painting may be in arbitrary shape in the real world, so that a conventional method for paint detection and modelling represents it with large error.

In an embodiment, a method for detecting and modelling of an object on a surface of a road merges information regarding the 3D road surface and detected objects or road paints on the surface of the road from distributed vehicles driving along the road at different times in order to adjust and refine the road surface estimation and road paint/object detecting. The framework of the method for detecting and modelling of an object on a surface of a road can be divided into four basic parts.

In a first part of the method, a road surface is estimated by each vehicle driving along the road. Each vehicle will report the respective detected road surface to a remote server. In the remote server, the different information obtained from the plurality of vehicles driving along the road are conflated. As a result, a more accurate road surface model is calculated in the remote server.

In a second part of the method, the course of the road captured by a forward-facing camera unit of a vehicle is transformed from the front camera view into a bird's-eye view. In particular, for every frame captured by the camera unit, an inverse perspective transformation is done first, before part of the image will be extracted to combine into a large image of the complete course of the road. An object on a surface of the road or a road painting will be detected in the top-view/bird's-eye view image of the scanned road.

In a third part of the method, a 3D object/paint projection is performed from the 2D top-view/bird's-eye view image to the 3D model of the road surface. After having projected a detected object/road paint from the 2D top-view/bird's-eye view image to the 3D model of the road surface, the 3D model of the road is evaluated to obtain a 3D position of the object/road paint and a logical information of the object/road paint.

In a last fourth part of the method, the detected object/road paint on the surface of the road is modelled in a 3D manner. As the object/road paint on the surface of the road may have any shape, a Non-Uniform Rational B-Spline (NURBS) technique may be used for the 3D modelling of the detected object/road paint. The NURBS curve fitting algorithm can advantageously represent any form of a curve so that the NURBS algorithm allows to represent any object/road paint on the surface of the road precisely. In comparison to a 3D modelling of an object/road paint by the proposed NURBS curve-fitting algorithm, a conventional method for modelling an object/road paint on a surface of a road usually represents a detected object/road paint by polylines which consumes a lot of memory capacitance. The NURBS algorithm, however, will extremely compress the data.

An embodiment relates to a system for detecting and modelling of an object on a surface of a road.

In an embodiment, the system includes a plurality of vehicles driving along the road, and a remote server being spatially located far away from the plurality of the vehicles. Each of the vehicles includes a respective camera unit to scan the road. Furthermore, each of the vehicles may be configured to generate a 3D model of the scanned road. The 3D model contains a description of the surface of the road. Each of the vehicles may be configured to create a respective individual top-view of the road and to forward the respective individual top-view of the road to the remote server.

The remote server may be configured to create a top-view image of the scanned road by evaluating and conflating the respective individual top-view images of the scanned road. The remote server may further be configured to detect an object on the surface of the road by evaluating the top-view image of the road. Furthermore, the remote server may be configured to project the detected object on the surface of the road in the 3D model of the scanned road. The remote server may further be configured to model the object projected on the surface of the road in the 3D model of the scanned road.

BRIEF DESCRIPTION OF THE DRAWINGS

In the following, the invention will be described by way of example, without limitation of the general inventive concept, on examples of embodiment and with reference to the drawings.

Figure 1:
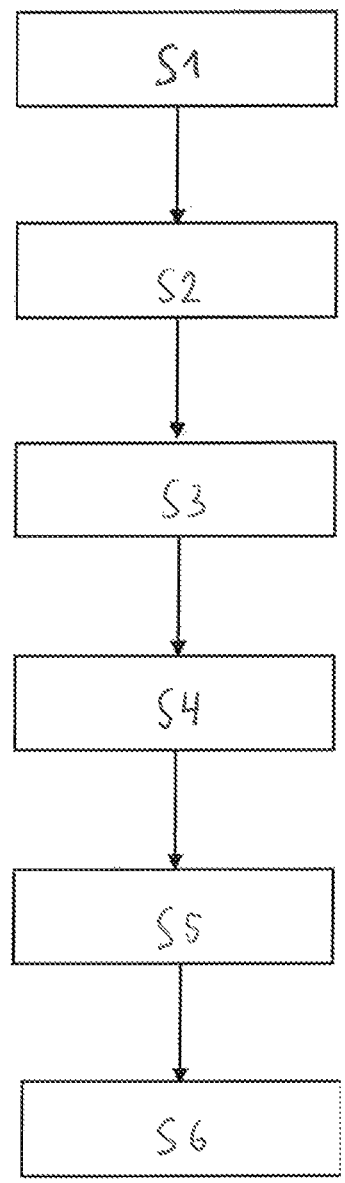
FIG. 1 shows a flowchart of a method for detecting and modelling of an object on a surface of a road.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

Figure 2:
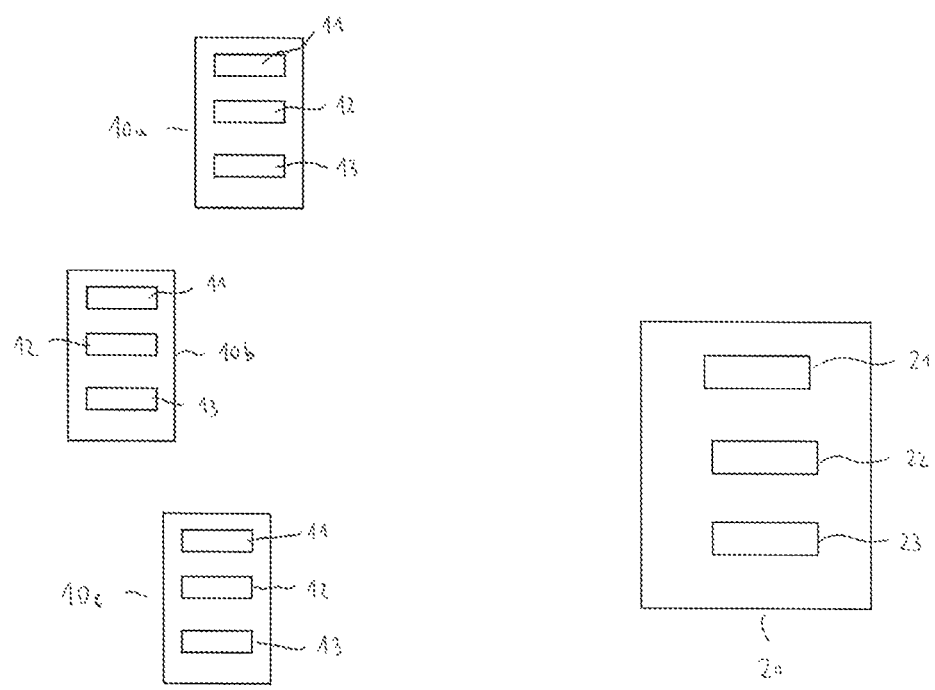
FIG. 2 shows a simplified block diagram of a system configured to detect and model an object on a surface of a road.

The method for detecting and modelling of an object on a surface of a road is explained in the following with reference to FIG. 1 illustrating a sequence of different steps of the method as well as with reference to FIG. 2 illustrating components of a system for detecting and modelling of an object on a surface of a road.

Figure 3A:
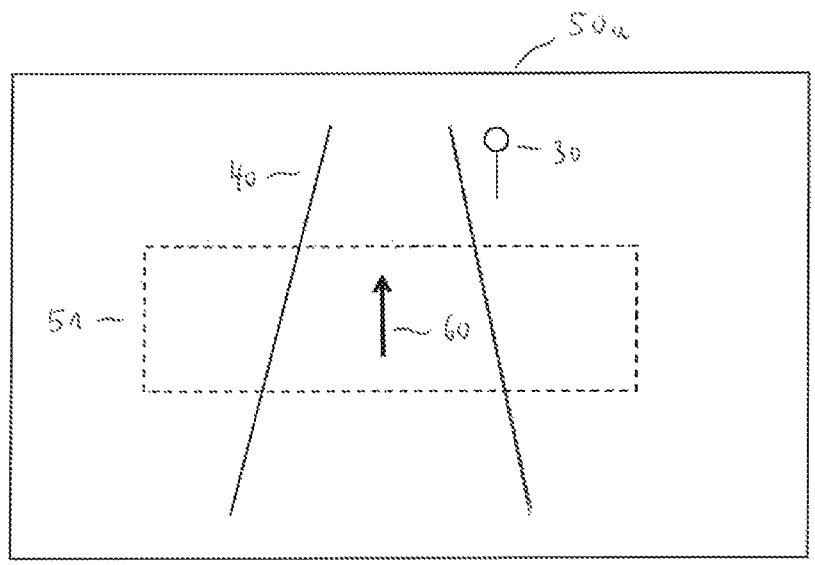
FIG. 3A shows a first simplified scene captured by a camera unit and a selection of an area of a captured picture of a road for further processing.
Figure 3B:
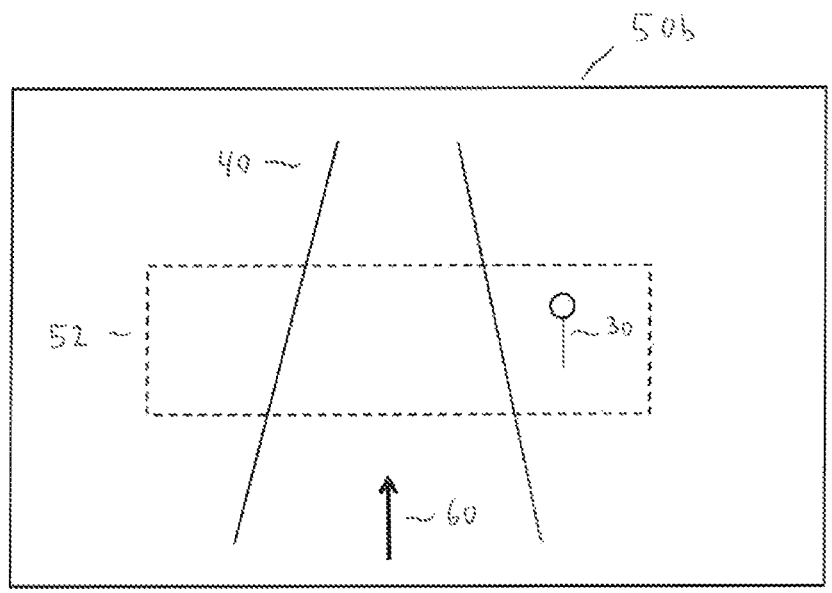
FIG. 3B shows a second simplified scene captured by a camera unit and a selection of an area of the captured picture of a road for further processing.

In step S1 of the method, the road 40 along which a vehicle is driving is scanned or optically examined or scrutinized by the vehicle. In an embodiment of the system shown in FIG. 2, a plurality of vehicles 10a, 10b and 10c drive along the road 40 and scan the course of the road during the driving process. For this purpose, each of the vehicles includes a respective optical camera unit 11. The camera unit 11 may be a vehicle-mounted, forwardly-facing camera. The respective camera unit 11 may include a CCD sensor array. Preferably, a simple mono-camera may be provided. Alternatively, a stereo camera, which may have two or more imaging sensors mounted at a distance (separated) from each other, may be used. FIG. 3A and FIG. 3B show two subsequent images 50a, 50b of the road 40 captured by the camera unit 11.

In step S2 of the method, a 3D model of the so-scanned road 40 is generated. The 3D model contains a description of a 3D surface of the road 40. Notably, the process of generation of a 3D model of the scanned road 40 is enabled even if the cameral unit 11 is configured as a mono-camera. The generated 3D model of the scanned road 40 may be construed or configured as a point cloud. In particular, a dense or semi-dense point cloud may be generated by evaluating the captured pictures with a respective processor unit 12 (of each of the vehicles 10a, 10b and 10c) while driving along the road. Here, a person of skill in the art will appreciate that degrees of density of the point cloud may be defined, for example, in accord with the common understanding of such degrees in related art. For example, a point cloud is considered to be sparse when its density is from about 0.5 pts/m$^2$ to about 1 pts/m$^2$; the density of the low-density point cloud is substantially between 1 pts/m$^2$ and 2 pts/m$^2$; the medium density point cloud may be characterized by the density of about 2 pts/m$^2$ to 5 pts/m$^2$; and the high density point cloud has a density from about 5 pts/m$^2$ to about 10 pts/m$^2$. The point cloud is considered to be extremely dense if its density exceeds 10 pts/m$^2$.

In an embodiment of the method, a respective individual 3D model of the scanned road 40 may be generated by each of the vehicles 10a, 10b and 10c. The respective individual 3D model may be forwarded by each of the vehicles 10a, 10b and 10c to a remote server 20 that is located far away (that is, spatially separated from) from these vehicles 10a, 10b and 10c. In order to transmit the respective generated individual 3D models of the scanned road 40 to the remote server 20, each of the vehicles 10a, 10b and 10c includes a communication system 13.

Each of the individual 3D models received from the vehicles 10a, 10b and 10c is stored in a storage unit 22 of the remote server 20. The remote server 20 generates the 3D model of the scanned road 40 by evaluating and conflating (merging) the respective individual 3D models of the scanned road 40 received from the vehicles 10a, 10b and 10c In particular, the various point clouds generated by each of the vehicles while driving along the road are matched (that is, fitted, for example by stretching and/or bending the point clouds, as appropriate) by a processor unit 21 of the remote server 20 to provide the 3D model of the road 40. The 3D model contains information about the road surface so that road surface estimation may be performed by the remote server 20. An accurate road surface model of the scanned road may be constructed by the processor unit 21 by conflating and matching the various individual 3D models generated by each of the vehicles 10a, 10b and 10c.

In step S3 of the method, a top-view/bird's-eye view image of (that is, an image formed a vintage point directly above) the road 40 is created. In particular, a respective individual top-view/bird's-eye view image of the scanned road 40 is created by each of the vehicles 10a, 10b and 10c. The respective individual top-view/bird's-eye view image is forwarded by each of the communication systems 13 of the vehicles 10a, 10b and 10c to the remote server 20. The remote server 20 may create the top-view image of the scanned road 40 by evaluating and conflating the respective individual top-view images of the scanned road 40. Objects located on the surface of the road, for example road paints, may be detected by the processor unit 21 by evaluating the 3D model of the scanned road 40 and the top-view image of the scanned road 40.

The creation of the respective individual top-view images of the scanned road 40 by each of the vehicles 10a, 10b and 10c is described in the following with reference to FIGS. 3A and 3B.

FIG. 3A shows a first image/picture 50a of a simplified scene as captured by the camera unit 11 of one of the vehicles 10a, 10b and 10c driving along the road 40. FIG. 3B shows a second image/picture 50b of the simplified scene captured by the camera unit 11 of the same of the vehicles 10a, 10b and 10c a short time later than the first picture. A dotted line in each of the captured images 50a, 50b designates/surrounds a zone (or region, or portion) of each of the images 50a, 50b in which the camera optics of the camera unit 11 cause minimum optical distortion. The zone in which the camera optics cause minimum distortion is located in the central area of each of the captured pictures 50a, 50b.

As a given vehicle moves forward, features in the scene move towards (approach) the vehicle from the front and ultimately pass the vehicle, leaving the boundaries of the scene defined by the field-of-view of the camera unit 11. As illustrated in FIG. 3B, the vehicle has already moved forward a certain distance (judging by comparison with the scene shown in FIG. 3A) so that an object/road paint 60 located on the surface of the road 40, for example a directional arrow, is now repositioned in the foreground. Similarly, a traffic sign 30 shown in FIG. 3A in the background region has moved in a central area of the image 50b. As shown in FIGS. 3A and 3B, a sequence of images—in this example, of at least a first respective individual picture 50a and a second respective individual picture 50b—is captured with a time delay by the respective camera unit 11 of each of the vehicles 10a, 10b and 10c. A respective first area 51 of the captured image 50a is selected by each of the vehicles 10a, 10b and 10c from the first image 50a to be is located in a zone of the first image 50a in which the optics of the camera unit 11 cause minimum distortion. Furthermore, a respective second area 52 of the captured image 50b is selected by each of the vehicles 10a, 10b and 10c from the second image 50b to be located in a zone of the second image 50b in which the optics of the camera unit 11 cause minimum distortion.

The respective first selected areas 51 are then transformed by each of the vehicles 10a, 10b and 10c to a respective first top-view perspective of the scanned road. Furthermore, the respective second selected areas 52 are then transformed by each of the vehicles 10a, 10b and 10c to respective second top-view perspectives of the scanned road. In order to create the respective individual top-view/bird's-eye view image, these respective first and second top-view perspectives are stitched together (for example, with the use of an approach known in the art) by each of the vehicles 10a, 10b and 10c.

The transformation to obtain the top-view perspective of the respective selected area and the step of stitching together the top-view perspectives may be executed by the respective processor unit 12 of each of the vehicles 10a, 10b and 10c. The transformation may be, for example, an inverse perspective transformation which transforms each of the areas 51, 52 from the view of the camera unit 11 into the bird's-eye view. As a result of stitching the respective top-view perspective with one another by various vehicles, the individual views of the same road—from the points of view of various vehicles—are formed, which are position-dependent.

In the step S4 of the method, the object/road paint 60 on the surface of the road 40 (illustrated in this example by the directional arrow shown in FIGS. 3A and 3B) is detected by evaluating the top-view image of the road 40 (while searching for objects and/or changes in color and/or contours of colored portions of the top-view image). This step allows to detect objects located on the surface of the road 40 such as road paints or other objects, for example, a cover of a water drain.

In a step S5 of the method, the detected object 60 is projected on the surface of the road 40 in the 3D model of the scanned road 40. In order to perform the projecting step to effectuate the mathematical projection via one of the known methods; as defined in linear algebra, in one example), the pictures 50a, 50b of the road captured by the camera unit 11, the top-view image of the road, and the point cloud of the 3D model of the scanned road are compared and matched by the processor unit 21 of the remote server 20.

The matching process is configured to enable to project a detected object 60 in the 3D model of the scanned road 40. In one embodiment, a 3D position and a logical information about the object 60 is determined after having projected the object 60 detected in the top-view image of the road 40 on the surface of the road 40 in the 3D model of the scanned road.

In the step S6 of the method, the object 60 projected on the surface of the road 40 in the 3D model of the scanned road is modelled. For this purpose, a mathematical curve fitting algorithm may be used. In particular, a Non-Uniform Rational B-Spline (NURBS) technique may be used to perform curve fitting. This so-called NURBS methodology can represent any form of a curve so that it is enabled to represent a detected object/road paint precisely.

It will be appreciated by those skilled in the art having the benefit of this disclosure that implementations of invention are believed to provide a method for detecting and modelling of an object on a surface of a road. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system for detecting and modelling of an object on a surface of a road, comprising:
   a plurality of vehicles,
   a remote server spatially located far away from the plurality of vehicles,
   wherein each of the vehicles carries a respective camera unit configured to scan the road when said vehicle is driving along the road,
   wherein each of the vehicles is configured to generate a 3D model of a scanned road, the 3D model containing a description of the surface of the road,
   wherein each of the vehicles is configured to create a respective individual top-view image of the road and to forward the respective individual top-view image to the remote server,
   wherein the remote server is configured to create an aggregate top-view image of the scanned road by evaluating and conflating the respective individual top-view images of the scanned road,
   wherein the remote server is configured to detect the object on the surface of the road by evaluating the top-view image of the road,
   wherein the remote server is configured to project the detected object on the surface of the road in the 3D model of the scanned road,
   wherein the remote server is configured to create a model of the object projected on the surface of the road in the 3D model of the scanned road.

2. The system of claim 1, wherein the remote server is configured to model the object with the use of a Non-Uniform Rational B-Splines curve fitting algorithm.

* * * * *